April 9, 1957 E. M. BALDWIN 2,788,381

FUSED-JUNCTION SEMICONDUCTOR PHOTOCELLS

Filed July 26, 1955

EWART M. BALDWIN
INVENTOR

BY Henry Heyman
ATTORNEY

United States Patent Office 2,788,381

Patented Apr. 9, 1957

2,788,381

FUSED-JUNCTION SEMICONDUCTOR PHOTOCELLS

Ewart M. Baldwin, Los Angeles, Calif., assignor to Hughes Aircraft Company, Culver City, Calif., a corporation of Delaware Application July 26, 1955, Serial No. 524,473

17 Claims. (Cl. 136—4)

The present invention relates to photosensitive devices and more particularly to an improved fused-junction photocell.

Semiconductors, such as germanium, silicon, germanium-silicon alloy, indium-antimonide, aluminum-antimonide, gallium-antimonide, indium-arsenide, aluminum-arsenide, gallium-arsenide, lead-sulfide, lead-telluride, lead selenide, cadmium-sulfide, cadmium-telluride, cadmium-selenide, or others, have been found to be extremely useful in electrical devices for translating electromagnetic energy, such as light or other radiant energy, into electric currents. In particular, these devices have been utilized for sensing light and other forms of radiant energy and for amplifying or rectifying electrical input signals.

The photocell of the present invention may be utilized as either a photovoltaic, photoresistive, or photoconductive device depending upon the presence and/or the polarity of an applied bias voltage. If no bias is provided the device will act as a photovoltaic cell in the presence of light. Bias in the forward direction will allow the device to be employed as a photoconductive cell, while a bias in the back direction need be provided for it to act as a photoresistive device.

Basic to the theory of operation of semiconductor devices is the concept that current flow may be carried on in two distinctly different manners, namely, "conduction by electrons" or "excess electron conduction" and "conduction by holes" or "deficit electron conduction." The fact that electrical conduction by both of these processes may occur simultaneously and separately in a semiconductor specimen affords a basis for explaining the electrical behavior of semiconductor devices. One manner in which the conductivity of a semiconductor specimen may be established is by the addition of "active impurities" to the semiconductor material.

In the semiconductor art, the term "active impurities" is used to denote those impurities which are purposely added to affect the electrical characteristics of a semiconductor material as distinguished from other impurities which are not intentionally added and which have no appreciable effect upon these characteristics. Generally active impurities are added intentionally to the semiconductor material for producing single crystals having predetermined electrical characteristics.

Active impurities are classified as either donors such as antimony, arsenic, bismuth, and phosphorus, or any other elements of group V of the periodic table as compiled by Mendeleev, or acceptors such as indium, gallium, thallium, boron, and aluminum, or any other element of group III of the periodic table as compiled by Mendeleev.

A region of semiconductor material containing an excess of donor impurities and yielding an excess of free electrons called "majority carriers" in that region is considered to be an impurity-doped N-type region. An impurity-doped P-type region, on the other hand, is one containing an excess of acceptor impurities resulting in a deficit of electrons or, stated differently, an excess of holes called "majority carriers" in that region. "Minority carriers" are holes in a predominately N-type region, or electrons in a predominantly P-type region. In other words, an N-type region is one characterized by electron conductivity, whereas a P-type region is one characterized by hole conductivity.

When a photon of radiant energy preferably in the infra-red or visible portion of the electro-magnetic wave spectrum strikes a semiconductor material, an electron and corresponding hole are produced as a pair. It is the flow of either the holes or electrons which produces conduction in the device. The generation rate, i. e., the time rate of creation of electron-hole pairs is a function of the number of photons which impinge upon the semiconductor crystal and which are not reflected at the surface of the crystal.

Unfortunately, after the electron-hole pairs are thus produced, there is a tendency for them to recombine. That is, the minority carrier has a tendency to recombine with an impurity atom to cause both the electron and hole to disappear. This recombination has been theorized to depend at least in part upon the following parameters: perfection of the semiconductor crystal, resistivity of the semiconductor crystal, surface condition of the semiconductor crystal and surface-to-volume ratio of the semiconductor crystal.

In order to reduce the recombination rate and thus increase the responsiveness of semiconductor photocells it has been found desirable to place the collector junction close to that portion of the crystal at which the light or radiant energy impinges.

It is thus desirable to provide a device wherein the region of the impinging radiant energy is as close as possible to the collector junction and which is impervious to moisture.

Accordingly, it is an object of this invention to provide a photo-responsive semiconductor photocell of improved performance characteristics.

Another object of this invention is to provide a photocell which is hermetically sealed and therefore impervious to moisture.

Still another object of this invention is to provide a new and novel photocell which is of simple design and hence easy to construct.

A feature of this invention is the provision of a semiconductor photocell in which the collector junction is placed close to the impinging radiant energy to give greater light collection efficiency at the photosensitive area.

In accordance with one embodiment of the present invention there is provided a semiconductor crystal having a P–N junction in a region thereof. Fused to this region is a glass lens having an electrically conductive layer on the lower face which face makes contact with the aforementioned region. Wholly enclosing the semiconductor crystal is a metallic casing which is physically and electrically connected to the glass lens. The above-referred-to P–N junction may be produced by electroforming or thermally fusing a semiconductor crystal to the lower side of the lens which has a metallic layer including an active impurity of the opposite conductivity type from that of the semiconductor crystal or the P–N junction may be produced by any other method known to the art.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and example only, and is not intended as a definition of the limits of the invention.

For the purpose of clarity, the invention will be discussed assuming the semiconductor crystal to be of N-type conductivity germanium having a P–N junction. It is to be expressly understood, however, that the invention is equally applicable to the utilization of a P-type conductivity germanium crystal, or any other semiconductor material, showing suitable light sensitivity, such as N- or P-type silicon, N- or P-type germanium-silicon alloy, or other semiconductor crystals hereinbefore mentioned.

Figure 1:
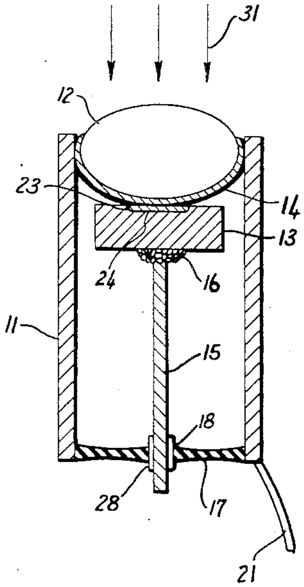
Fig. 1 is an enlarged cross-sectional view of an electrical device sensitive to externally applied radiant energy constructed in accordance with the present invention.

Referring now to the drawing, wherein like reference characters designate like parts throughout the various views, there is shown in Fig. 1, a preferred embodiment of a photocell according to this invention. Casing or envelope 11 may be of cylindrical shape as shown and is a conductor to provide a current path. Envelope 11 may be made of metal or any other material possessing suitable electrical conductivity. Optical lens 12, which may be of glass, has provided on its lower surface a layer of electrically conductive material 14 including an active impurity of the opposite type from that which determines the conductivity type of a germanium crystal or wafer 13. As crystal 13 has been assumed to be of N-type conductivity germanium the active impurity need be an acceptor impurity.

Bearing in mind this assumption, i. e., that the semiconductor wafer is germanium and is of N-type conductivity, the active impurity contained in conductive layer 14 on lens 12 may be indium, for example. Wafer 13 may be fused or welded to the "outer periphery" of glass lens 12 through layer 14. What is meant herein by the term "outer periphery" is the lowei surface of lens 12 up to at least that part of the surface which is tangent to a plane passing horizontally through the center line of the lens. The term "outer periphery" may also include more of the outer surface of lens 12 than above described, and in the extreme case coating 14 may be placed over the entire surface of lens 12.

Fusion of lens 12 through layer 14 to envelope 11 will take place at the same time that wafer 13 is sealed to the lens to provide a hermetic seal between lens 12 and casing or envelope 11.

Crystal 13 may be mounted on conductor or electrode 15 by solder 16. An insulator disc 17 which may be made of glass, has a hole 18 through its center and is to be used to provide a hermetic seal between electrode 15 and conductive sleeve 28 which is soldered to electrode 15. Lead 21 is connected to envelope 11. In order to insure a perfect seal it may be preferable to make electrode 15 and envelope 10 of a material such as Kovar which has substantially the same thermal coefficient of expansion as glass lens 12.

In the manufacture of a photocell device of the present invention an electrical-forming current may be passed through crystal 12 by applying a voltage between electrode 15 and lead 21 to produce a P–N junction therein by a method now to be explained. Inasmuch as crystal 13 has been assumed to be N-type conductivity germanium, what is desired is to provide a P-type conductivity region in a portion of the crystal. Accordingly as already explained, the conductive coating 14 on lens 12 contains an active impurity of the P-type, such as indium for example.

After crystal 13 has been brought into intimate physical engagement with coating 14 on lens 12, a welding or forming current is impressed between electrode 15 and lead 21 by a source of voltage not shown.

The heat developed by the forming current melts a portion of the conductive coating 14 which, in turn, melts or dissolves the region of the germanium crystal 13 adjacent the contact area, thereby permitting indium atoms from the coating 14 to form an indium-germanium alloy which upon cooling recrystallizes to produce a strongly acceptor impurity-doped P-type region 23 in N-type crystal 13, resulting in the P–N junction 24.

The metal casing 11, coating 14 and crystal 13, in the preferred embodiment of the invention as shown in Fig. 1 form a closed-loop current path between electrode 15 and lead 21. Casing 11 and electrode 15 are insulated by disc 17. The heat due to forming current or a fusion formed will produce a regrown, doped P-type region 23 in crystal 13 in the region adjacent the lens-crystal contact thereby to provide a P–N junction 24.

In another embodiment of the present invention, the conductive layer 14 is not provided with an active impurity, the crystal 13 having been previously provided with a P-type region 23 by any method known to the art. No welding or fusion is then necessary between the coating 14 and crystal 13; the only requirement now being that there be intimate physical engagement between lens 12 and crystal 13 to establish electrical contact.

Figure 2:
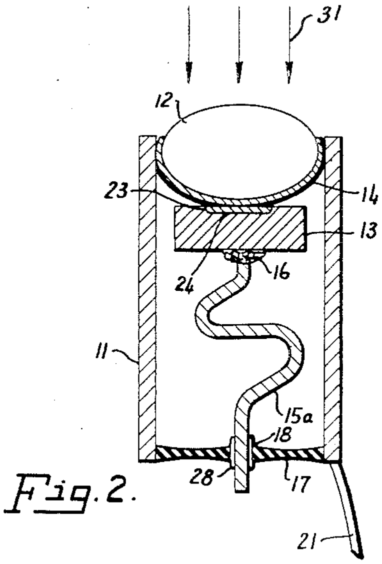
Fig. 2 is an enlarged cross-sectional view of a modified version of the device of Fig. 1.

Fig. 2 shows an alternative embodiment of the device of Fig. 1 wherein electrode **15*a* is made of a resilient metal wire and bent into a springlike shape in order to insure that the proper contact pressure will always be maintained between lens 12 and region 23. The shape of the wire need not necessarily be S-shaped as shown, but may be of any other shape which will impart a resilient force on crystal 13**.

Figure 3:
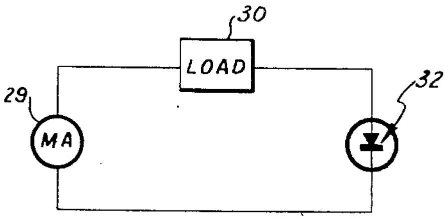
Fig. 3 is a circuit diagram of one embodiment of the photocell utilized as a photovoltaic generator.

Fig. 3 depicts an arrangement whereby the device of the present invention may be utilized as a photovoltaic device. A current meter 29 is connected in series with the device shown schematically at 32 which indicates the current delivered by the device 32 to the load element 30 in response to the radiant energy, generated by light source represented by arrows 31, impinging upon the upper surface of the crystal 13 through lens 12.

Figure 4:
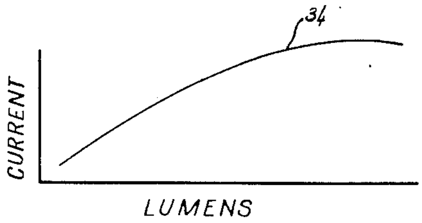
Fig. 4 is a graph showing, as a function of luminosity, the current delivered to a load element by the photocell when connected as shown in Fig. 3.

The graph in Fig. 4 shows a curve 34 representing the electrical current produced as a function of light intensity or lumens and measured by meter 29 for an arrangement typified by that presented in Fig. 3.

The hermetic seal established between glass lens 12 and envelope 11 allows lens 12 to perform the additional useful function of focusing the radiant energy indicated by arrows 31 upon the photosensitive collector junction 24 to increase the sensitivity of the device.

There has thus been disclosed a new and novel semiconductor photocell which has improved performance characteristics and which is easy to construct.

What is claimed is:

1. A photosensitive translating device comprising: a wafer of semiconductor material of one conductivity type having a first and a second face, said wafer having a region of a conductivity type opposite that of said wafer in said first face; an optical lens; a conductive coating disposed on a portion of the surface of said lens, said conductive coating being electrically and mechanically connected at said portion of said lens to said first face of said wafer at said region; a conductor electrically and mechanically connected to said conductive coating; and an electrode ohmically connected to said second face of said wafer.

2. A photosensitive translating device comprising: a wafer of semiconductor material of one conductivity type having a first and a second face, said wafer having a region of a conductivity type opposite that of said wafer in said first face; an optical lens; a conductive coating including an active impurity of the same conductivity type as that of said region disposed on a portion of the surface of said lens, said conductive coating being electrically and mechanically connected at said portion of said lens to said first face of said wafer at said region; a conductor electrically and mechanically connected to said conductive coating; and an electrode ohmically connected to said second face of said wafer.

3. A photosensitive translating device comprising: a wafer of semiconductor material of one conductivity type having a first and a second face, said wafer having a region of a conductivity type opposite that of said wafer in said first face; an optical lens; a conductive coating disposed on a portion of the surface of said lens, said lens being mechanically connected through said conductive coating to said first face of said wafer at said region; a conductive envelope sealed at one end thereof to the outer periphery of said lens, said conductive coating covering said outer periphery of said lens, whereby said conductive coating is electrically connected to said envelope, and said envelope being so constructed and arranged as to partially encase said lens and to wholly encase said wafer; and an electrode ohmically connected to the second face of said wafer.

4. A photosensitive translating device comprising: a wafer of semiconductor material of one conductivity type having a first and a second face, said wafer having a doped region of a conductivity type opposite that of said wafer in said first face; an optical lens; a conductive coating disposed on a portion of the surface of said lens, said coating including an active impurity of the same conductivity type as that of said region, said conductive coating being welded at said portion of said lens to said first face of said wafer at said doped region; said conductive coating covering the outer periphery of said lens; a conductive envelope sealed at one end thereof to said conductive coating at said outer periphery of said lens, and said envelope being so constructed and arranged as to partially encase said lens and to wholly encase said wafer; and an electrode ohmically connected to the second face of said wafer.

5. A photosensitive translating device comprising: a wafer of semiconductor material of one conductivity type having a first and a second face, said wafer having a doped region of a conductivity type opposite that of said wafer in said first face; an optical lens; a conductive coating disposed on a portion of the surface of said lens, said conductive coating being electrically connected at substantially the center of said portion of said lens to said first face of said wafer at said doped region, said conductive coating covering the outer periphery of said lens; a hollow substantially cylindrical opaque conductive envelope sealed at one end thereof to said conductive coating at the outer periphery of said lens, said envelope being so constructed and arranged as to partially encase said lens and to wholly encase said wafer; and an electrode ohmically connected to the second face of said wafer.

6. A photosensitive translating device comprising: a wafer of semiconductor material of one conductivity type having a first and a second face, said wafer having a doped region of a conductivity type opposite that of said wafer in said first face; an optical lens; a conductive coating disposed on a portion of the surface of said lens, said coating including an active impurity of the same conductivity type as that of said region, said lens being welded through said coating at substantially the center of said portion thereof to said first face of said wafer at said doped region, said conductive coating covering the outer periphery of said lens; a substantially cylindrical, hollow opaque conductive envelope sealed at one end thereof to said conductive coating at the outer periphery of said lens, said envelope being so constructed and arranged as to partially encase said lens and to wholly encase said wafer; and an electrode ohmically connected to the second face of said wafer.

7. The device defined in claim 4 wherein said lens has substantially the same thermal coefficient of expansion as said envelope and said electrode.

8. The device defined in claim 5 including an insulator member disposed in the open end of said envelope remote from said lens, said insulator member having an opening therein to permit said electrode to pass therethrough.

9. The device defined in claim 1 wherein said semiconductor material is germanium.

10. The device defined in claim 1 wherein said semiconductor material is silicon.

11. A photosensitive translating device comprising: a wafer of N-type conductivity germanium having a first and a second face, said wafer having a P-type region in said first face; an optical lens; a conductive coating disposed on a portion of the surface of said lens, said conductive coating being electrically and mechanically connected to said first face of said wafer at said P-type region, said conductive coating covering the outer periphery of said lens; a hollow substantially cylindrical opaque conductive envelope sealed at one end thereof to said conductive coating at the outer periphery of said lens, said envelope being so constructed and arranged as to partially encase said lens and to wholly encase said wafer; an electrode ohmically connected to the second face of said wafer; and an insulator disc disposed in the open end of said conductive envelope remote from said lens, said disc having an opening therein; and a hollow conductive sleeve mechanically fixed in said opening for receiving said electrode.

12. A photosensitive translating device comprising: a wafer of N-type conductivity germanium having a first and a second face, said wafer having a P-type region in said first face; an optical lens; a conductive coating disposed on a portion of the surface of said lens, said coating including an acceptor impurity, said lens being welded through said conductive coating at said portion of said lens to said first face of said wafer at said P-type region, said conductive coating covering said outer periphery of said lens; a substantially cylindrical hollow opaque conductive envelope sealed at one end thereof to the outer periphery of said lens, said envelope being so constructed and arranged as to partially encase said lens and to wholly encase said wafer; an electrode ohmically connected to the second face of said wafer; an insulator disc disposed in the open end of said conductive envelope remote from said lens, said disc having an opening therein; and a hollow conductive sleeve mechanically fixed in said opening and arranged to permit said electrode to extend therethrough.

13. A photosensitive translating device comprising: a wafer of P-type conductivity germanium having a first and a second face, said wafer having an N-type region in said first face; an optical lens; a conductive coating disposed on a portion of the surface of said lens, said lens being welded through said conductive coating at said portion of said lens to said first face of said wafer at said N-type region, said conductive coating covering said outer periphery of said lens; a substantially cylindrical hollow opaque conductive envelope sealed at one end thereof to the outer periphery of said lens, said envelope being so constructed and arranged as to partially encase said lens and to wholly encase said wafer; an electrode ohmically connected with said second face of said wafer; and an insulator disc disposed in the open end of said conductive envelope remote from said lens, said disc having an opening therein; and a hollow conductive sleeve mechanically fixed in said opening for receiving said electrode.

14. A photosensitive translating device comprising: a wafer of P-type conductivity germanium having a first and a second face, said wafer having an N-type region in said first face; an optical lens; a conductive coating disposed on a portion of the surface of said lens, said coating including a donor impurity, said lens being welded through said conductive coating at said portion thereof to said first face of said wafer at said N-type region, said conductive coating covering said outer periphery of said lens; a hollow substantially cylindrical opaque conductor envelope sealed at one end thereof to the outer periphery of said lens, said envelope being so constructed and arranged as to partially encase said lens and to fully encase said wafer; an electrode ohmically connected to the second face of said wafer; and an insulator disc disposed in the open end of said conductive envelope remote from said lens, said disc having an opening therein; and a hollow conductor tube mechanically fixed in said opening and arranged to permit said electrode to extend therethrough.

15. A photosensitive translating device comprising: a wafer of N-type conductivity germanium having a first and a second face, said wafer having a P-type conductivity region in said first face; an optical lens; a conductive coating disposed on a portion of the surface of said lens, said coating including indium, said lens being welded through said conductive coating at said portion thereof to said first face of said wafer at said P-type region, said conductive coating covering said outer periphery of said lens; a hollow, substantially cylindrical opaque envelope sealed at one end thereof to the outer periphery of said lens, said envelope being so constructed and arranged as to partially encase said lens and to wholly encase said wafer; an electrode ohmically connected to the second face of said wafer; and an insulator disc disposed in the open end of said conductive envelope remote from said lens, said disc having an opening therein; a hollow conductor tube mechanically fixed in said opening and arranged to permit said electrode to extend therethrough.

16. The device defined in claim 1 wherein said electrode comprises a spring-shaped resilient metallic wire.

17. The device defined in claim 2 wherein said electrode comprises a spring-shaped resilient metallic wire.

References Cited in the file of this patent

UNITED STATES PATENTS

| | | |
|---|---|---|
| 2,522,987 | Buck | Sept. 19, 1950 |
| 2,641,712 | Kircher | June 9, 1953 |
| 2,644,852 | Dunlap | July 7, 1953 |
| 2,669,663 | Pantchechnikoff | Feb. 16, 1954 |